Patented Dec. 9, 1947

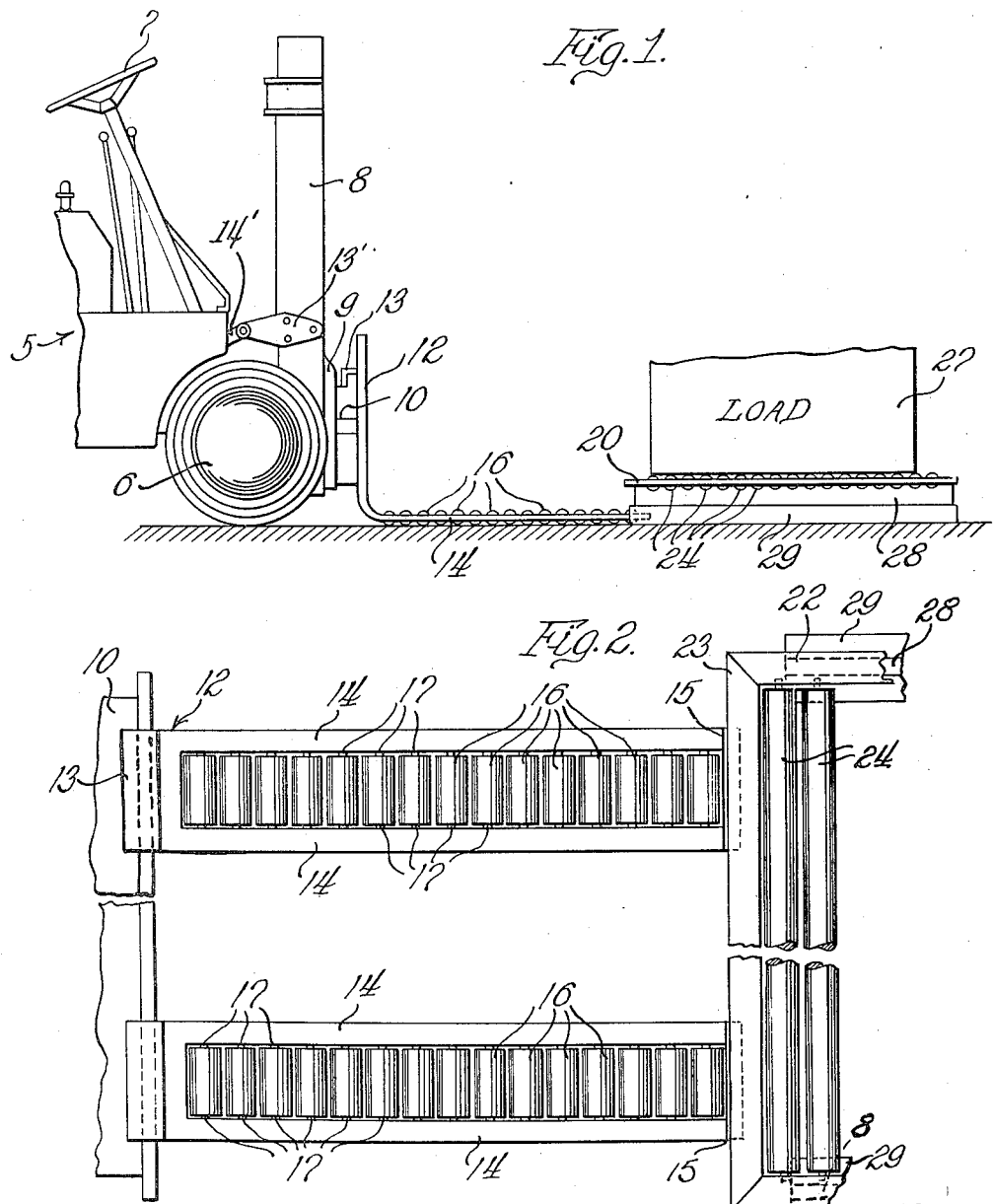

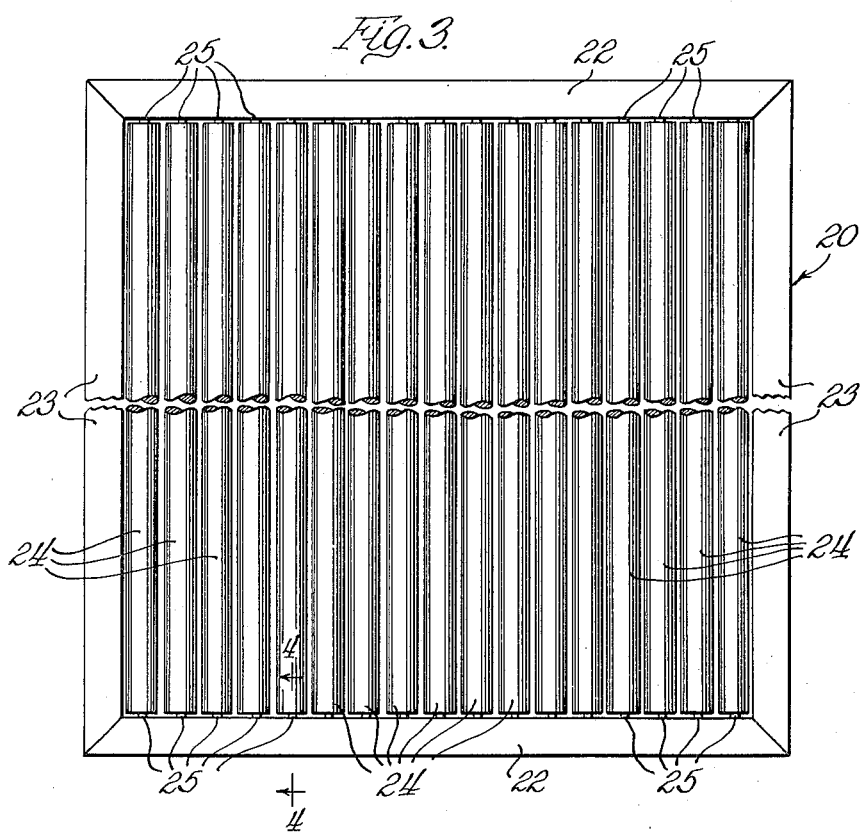
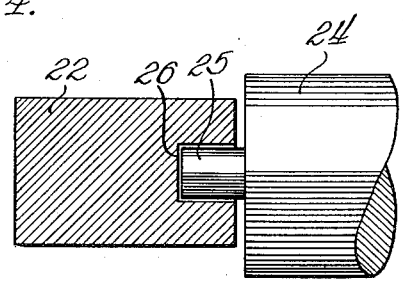
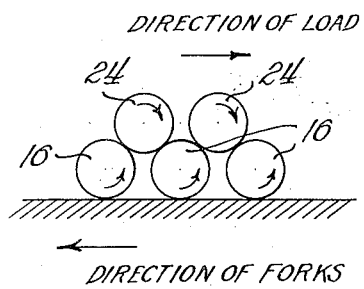
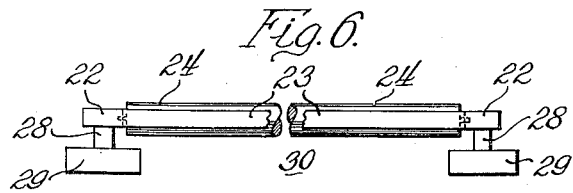

2,432,182

UNITED STATES PATENT OFFICE 2,432,182

INDUSTRIAL TRUCK FOR HANDLING MATERIAL

George L. Turner, Battle Creek, Mich., assignor to Clark Equipment Company, Buchanan, Mich., a corporation of Michigan Application March 14, 1946, Serial No. 654,428

12 Claims. (Cl. 214—84)

This invention relates to a method of and means for handling material, and more specifically is concerned with the handling of packaged or crated material by means of industrial trucks of the fork type, wherein it is desired to pick up a pallet loaded with such material, transport it to a desired location, and discharge the load from the pallet without removing the pallet from the truck so that the pallet and truck can then return to the original point of loading.

While the invention is particularly applicable to the use of pallets at the end of conveyor lines where the material can be loaded from the conveyor line onto the pallet and the pallet can then be picked up by the truck and transported to a desired location where the load may be discharged from the pallet and the truck and pallet returned to its original location without requiring the operator to leave the truck, or requiring any manual handling of the load during such movement, it will be obvious, as this description proceeds, that the invention is equally well adapted to widespread use in situations other than this specific operation.

In carrying out the present invention, it is contemplated that the pallet will be provided with a series of closely spaced rolls which extend transversely over the major portion of the pallet area, and upon which the load is supported. The forks of the industrial truck similarly are provided with transversely arranged rolls of substantially the same size as the pallet rolls, whereby, when the forks are moved beneath the pallet and then raised to pick up the pallet and its load, the rolls will interlock and nest in such manner that the pallet is maintained upon the forks against longitudinal displacement therefrom. When the load has thus been transported to the desired location, lowering of the forks to the ground and backing away of the truck will cause the rolls on the forks to engage the ground and be rotated in one direction, producing opposite rotation of the pallet rolls due to the frictional contact therebetween which, in turn, will roll the load off of the pallet without causing the pallet to become dislodged from the forks. The truck, with the pallet still on the forks, can then be returned to the original location and the pallet placed on a suitable stand for receiving another load.

One of the primary objects of the present invention is to provide an automatic pallet unloading device, using the motion of the industrial truck to unload the pallet.

Another object of the present invention is to provide a construction and arrangement whereby pallet loads of material from the end of a conveyor line or the like may be picked up by the truck, transported into a box car, or any other point at which the load is to be discharged, and, by lowering the forks to the ground or supporting surface, the load is automatically rolled off of the pallet as the truck is withdrawn.

Still another feature of the present invention is to provide a pallet construction in which the load can be discharged therefrom by frictional engagement with rolls carried by the pallet without requiring any unloading pusher or similar mechanism on the truck, and also without requiring dislocation of the pallet relative to the forks of the truck.

A still further feature residing in the present invention is the provision of a method of picking up and transporting pallet loads of material and automatically discharging the same at any desired location, it being understood that the invention is equally applicable to discharge of pallet loads either on ground surfaces or on any tiers of material where the rolls of the forks are able to be frictionally engaged for rotation as the truck is driven rearwardly to withdraw the forks across such surface.

Other objects and advantages of the present invention will appear more fully from the following detail description which, taken in conjunction with the accompanying drawings, will disclose to those skilled in the art the particular construction and operation of a preferred form of the present invention.

In the drawings:

Figure 1 is an elevational view of a truck and pallet construction embodying the present invention with the truck in position to move in and pick up the pallet and its associated load;

Figure 2 is a plan view of the truck forks and pallets shown in Figure 1;

Figure 3 is a plan view of the pallet construction;

Figure 4 is a detail sectional view taken on line 4—4 of Figure 3;

Figure 5 is a diagrammatic view illustrating the principle employed in providing for automatic unloading of the pallet; and Figure 6 is an end elevational view of a pallet on its stand as it would appear when ready to be picked up by the forks of the truck.

Referring now in detail to the drawings, in Fig. 1 I have illustrated a conventional type of industrial fork truck such as manufactured by the Clark Equipment Company of Battle Creek, Michigan, and known as a "Carloader," which includes a body portion 5 having a front drive axle and driving wheels 6, and provided with a rear steering axle (not shown) controlled through the steering wheel 7.

Pivotally mounted for forward and rearward tilting movement at the forward end of the truck is a vertical mast 8 which may consist of channel-shaped upright members, and may, if desired, be of the telescopic type having two or more sets of such channel members arranged in telescoping relationship to provide for greater lifting height. Mounted for vertical movement within the uprights 8 is a load-supporting carriage 9 having a face plate 10 upon which are mounted laterally spaced fork members indicated generally at 12, having bracket portions 13 by which such fork members are attached to and supported upon the face plate 10.

The uprights 8 are preferably provided adjacent the lower ends thereof with brackets 13 to which are connected piston rods 14 extending into suitable cylinders (not shown), hydraulically controlled for tilting the uprights either forwardly or rearwardly from a straight vertical position.

The forks 12 have forwardly projecting portions 14 consisting of two parallel side portions spaced apart laterally, and closed at their outer ends by means of the cross piece 15. Intermediate the two side portions 15 there are disposed a plurality of roll members 16, each having trunnioned ends 17 fitting in suitable sockets or recesses 18 formed in the side members 14 to provide bearing support therefor, whereby the rolls are free to rotate individually and are spaced slightly apart so that there is no frictional co-action therebetween. It will be noted that the rolls substantially fill the entire length of the horizontal portion of the fork, and are of a diameter such that they project vertically beyond the upper and lower surfaces of the side members 14, as is apparent from Fig. 1. If desired, these roll members may have frictional surfaces thereon, such as rubber sleeves vulcanized thereon or the like.

The pallet construction shown in detail in Fig. 3 consists of a rectangular frame member 20 having side portions 22 joined to the end portions 23 to form a substantially rigid frame work. Disposed therein are a plurality of transversely extending roll members 24 which project entirely across the space between the side portions 22 and have trunnioned ends 25 seating in recesses 26 formed in the side members 22 so as to journal the rolls for individual rotation. These rolls also may have frictional surfaces, if so desired.

The rolls are spaced slightly apart to avoid frictional contact therebetween, and, as will be seen from Fig. 4, are of a diameter such that they will project beyond the horizontal faces of the frame 20.

As will be seen from Figs. 1 and 6, the pallet 20 is adapted to receive a load, indicated generally at 27, which may consist of one large carton or crate, or may consist of a number of such cartons or crates arranged in stacked formation. It will be noted that the load is so loaded relative to the pallet that it is supported solely by the rollers 24, and that in the position shown in Fig. 1 the side members 22 of the pallet are seated upon longitudinal projections 28 of stand members 29, whereby the pallet is spaced above the ground or other supporting surface in such manner that the forks 14 can be moved thereunder as shown in Figure 2. This stand 29 may be conveniently located adjacent the end of a conveyor line whereby the elements making up the load 27 may move from the end of the conveyor line onto the pallet until the pallet has received its full load. The truck 5 then moves into position so that the projecting portions 14 of the lift forks extend into the space 30, shown in Fig. 6, beneath the pallet 20 and within the confines of the two stand members 19. When moved into position completely under the pallet 20, the forks 12 are raised by means of the hydraulic mechanism associated with the truck 5 until they engage the under surface of the pallet rolls 24. Inasmuch as the diameters of the roll members 16 and 24 are substantially the same, the pallet and its rolls will interlock with the rolls on the forks in nested relationship, as shown diagrammatically in Fig. 5, whereby the pallet is held against separation from the forks. The forks may then be raised to the transporting position, and preferably, the uprights 8 are tilted slightly rearwardly and the truck may then be driven away to transport the load to any discharge point, such as the interior of a box car or the like. When this point is reached, the forks are lowered either to the floor surface or to the upper surface of a previous stack of material, and the truck is then withdrawn rearwardly whereby the downwardly projecting portions of the rolls 16 engage the supporting surface and are frictionally rotated thereby in the direction shown in Fig. 5, assuming the truck is being withdrawn to the left in this figure.

Due to the frictional engagement between the respective rolls 16 and 24, rotation of the rolls 16 in the direction shown by the arrows in Figure 5 causes reverse rotation of the rolls 24, causing the load carried by the rolls 24 to be rolled in the opposite direction or off of the forward end of the pallet onto the supporting surface. Due to the fact that the rolls are in nested relationship, the pallet itself will be retained upon the forks, and the load will be automatically discharged therefrom onto the supporting surface. Thus, when the load is discharged, the pallet still remains in position on the forks and the truck returns to the original point of loading and replaces the pallet in position on the stands 29 for receiving another load. It is obvious that one truck in an operation of this type may be used to take away and discharge loads from two or three different conveyor lines, depending upon the rapidity with which the loads are assembled.

It is also apparent that the truck and pallet arrangement may be used for other operations than that specifically described above, and that the pallet need not be associated with a conveyor line but may be used for receiving any type of load which can be rolled on and off by the operation of lowering the forks to the supporting surface and driving the truck rearwardly to effect rotation of the rolls on the forks in such manner as to roll the load off the pallet rolls.

I am aware that various changes may be made in certain details of the construction herein involved, and that other types of industrial lift trucks may be used with forks having roll mechanisms described herein. Furthermore, it is apparent that in place of two separate laterally spaced forks, it will be possible to provide one broad fork member carrying rolls cooperating with the pallet rolls in the same manner as described.

I therefore do not intend to be limited to the specific details of the construction and operation of the mechanism herein illustrated, nor to the specific method of handling material as described, but only insofar as may be defined by the scope and spirit of the appended claims.

I claim:

1. Material handling means for use in connection with a fork type lift truck comprising a pair of forks for said truck adapted to be carried on one end thereof and mounted for conjoint raising and lowering movement, each of said forks having a forwardly projecting portion including a plurality of closely spaced transverse rolls of a diameter greater than the thickness of said forks, a pallet adapted to be carried by said forks and comprising a rectangular frame having a plurality of corresponding closely spaced rolls of greater diameter than the thickness of said frame and supporting the load on said pallet, whereby upon lowering of said forks to the ground and withdrawal of said truck said rolls coact frictionally to roll the load off said pallet while retaining the pallet on said forks.

2. In an industrial fork type lift truck having cooperating roll-carrying forks and a roll-carrying pallet, said rolls projecting beyond the vertical extent of said forks and pallet, and lying in nested relation to prevent longitudinal displacement of said pallet from said forks, the method of material handling which comprises first supporting said pallet with a load thereon above the ground, moving said forks thereunder, raising said forks to engage said pallet and raise said load, transporting said load, lowering said forks so that the rollers thereof engage the ground, and retracting said forks to rotate its rollers in one direction whereby the pallet rollers rotate in the opposite direction to discharge said load therefrom.

3. In an industrial fork type lift truck having cooperating roll-carrying forks and a roll-carrying pallet, said rolls projecting beyond the vertical extent of said forks and pallet, and lying in nested relation to prevent longitudinal displacement of said pallet from said forks, the method of material handling which comprises picking up said pallet and a load thereon by engaging said forks thereunder whereby the respective rolls move into nested frictional engagement, transporting said load to a new location, lowering said forks so that the rollers thereof engage the ground, and moving said truck rearwardly to rotate said rolls on the forks in one direction to thereby rotate the rolls of said pallet in the opposite direction to discharge said load therefrom.

4. In combination, with an industrial lift truck having a vertically movable load supporting carriage at one end thereof, a pair of laterally spaced forks thereon having forwardly projecting finger portions, each of said finger portions having transverse closely spaced rolls extending substantially the full length thereof and projecting beyond the horizontal faces thereof, and a pallet comprising a rectangular frame forming a support for a plurality of corresponding transverse rolls extending the full width thereof, whereby when said pallet is placed on said fingers said rolls interlock to prevent longitudinal displacement therebetween and frictionally engage so that rotation of the finger rolls in one direction produces counter-rotation of said pallet rolls without moving said pallet relative to said fingers.

5. The combination of claim 4 wherein said pallet rolls are of a diameter such that they project above and below the upper and lower surfaces of said frame.

6. A fork for an industrial type lift truck having a vertically movable load supporting carriage, comprising an L-shaped member, the vertical portion of which is adapted to be mounted on said carriage, the horizontal portion thereof including laterally spaced side rails, and a plurality of closely spaced roll members having their ends journaled in said side rails and arranged over substantially the full length of said horizontal portion of said fork.

7. The fork of claim 6 wherein said roll members are of a diameter such that they project beyond the horizontal planes defining the upper and lower surfaces of said side rails.

8. A pallet for use with a fork truck having roll-equipped lift fingers, comprising a generally rectangular open frame member, and a plurality of closely spaced transverse rollers completely filling said frame, said rollers having trunnion ends journalled in opposite side edges of said frame member.

9. The pallet of claim 8 wherein said rollers are of a diameter such that they project beyond the horizontal planes defining the upper and lower surfaces of said frame member.

10. The combination, with an industrial type truck having a vertically movable load carriage at one end thereof, of lift forks on said carriage having forwardly projecting finger portions provided with closely spaced transversely extending roll members, and a load supporting pallet adapted to be engaged by said finger portions and having corresponding transversely extending rollers on which the load is supported.

11. The combination, with an industrial type lift truck having a vertically movable load carriage at one end thereof, of lift forks supported on said carriage and having forwardly projecting finger portions, a pallet of generally rectangular shape for receiving a load to be transported by said truck and adapted to be lifted by said finger portions when moved thereunder, and interlocking rotatable means on said finger portions and said pallet whereby upon rotation of said means on said finger portions in one direction said rotatable means on said pallet rotate in the opposite direction to discharge the load from said pallet while retaining said pallet on said finger portions.

12. The combination of claim 11 including means normally supporting said pallet and its associated load at a sufficient level above the floor to provide for entry of said finger portions thereunder.

GEORGE L. TURNER.

REFERENCES CITED

The following references are of record in the file of this patent:

UNITED STATES PATENTS

| Number | Name | Date |
| --- | --- | --- |
| 472,922 | Griffith | Apr. 12, 1892 |
| 1,736,170 | Polk | Nov. 19, 1929 |
| 2,388,458 | Alfonte | Nov. 6, 1945 |

FOREIGN PATENTS

| Number | Country | Date |
| --- | --- | --- |
| 471,071 | Germany | Jan. 17, 1929 |